March 10, 1970 R. ZAPHIROPOULOS ET AL 3,500,434

ELECTROSTATIC WRITING EMPLOYING A TRANSLUCENT RECORDING MEDIUM WITH BACK ILLUMINATION AT THE INKING MEANS FOR IMMEDIATE READING

Filed Oct. 3, 1966 2 Sheets-Sheet 1

INVENTORS
RENN ZAPHIROPOULOS
WILLIAM A. LLOYD
BY Wm. J. Nolan
ATTORNEY

March 10, 1970 R. ZAPHIROPOULOS ET AL 3,500,434
ELECTROSTATIC WRITING EMPLOYING A TRANSLUCENT RECORDING MEDIUM WITH BACK ILLUMINATION AT THE INKING MEANS FOR IMMEDIATE READING
Filed Oct. 3, 1966 2 Sheets-Sheet 2

INVENTORS
RENN ZAPHIROPOULOS
WILLIAM A. LLOYD
BY Wm J Nolan
ATTORNEY

United States Patent Office 3,500,434

Patented Mar. 10, 1970

3,500,434

ELECTROSTATIC WRITING EMPLOYING A TRANSLUCENT RECORDING MEDIUM WITH BACK ILLUMINATION AT THE INKING MEANS FOR IMMEDIATE READING

Renn Zaphiropoulos, Los Altos, and William A. Lloyd, San Jose, Calif., assignors to Varian Associates, Palo Alto, Calif., a corporation of California Filed Oct. 3, 1966, Ser. No. 583,780
Int. Cl. G01d *15/14*
U.S. Cl. 346—74 2 Claims

ABSTRACT OF THE DISCLOSURE

A graphic electrostatic recorder or printer using a translucent recording medium with back illumination at the inking means for immediate reading. The back illumination is effected by a light source located in the inking slot which conveys the ink material to the selectively charged record medium.

Figures 1, 2:
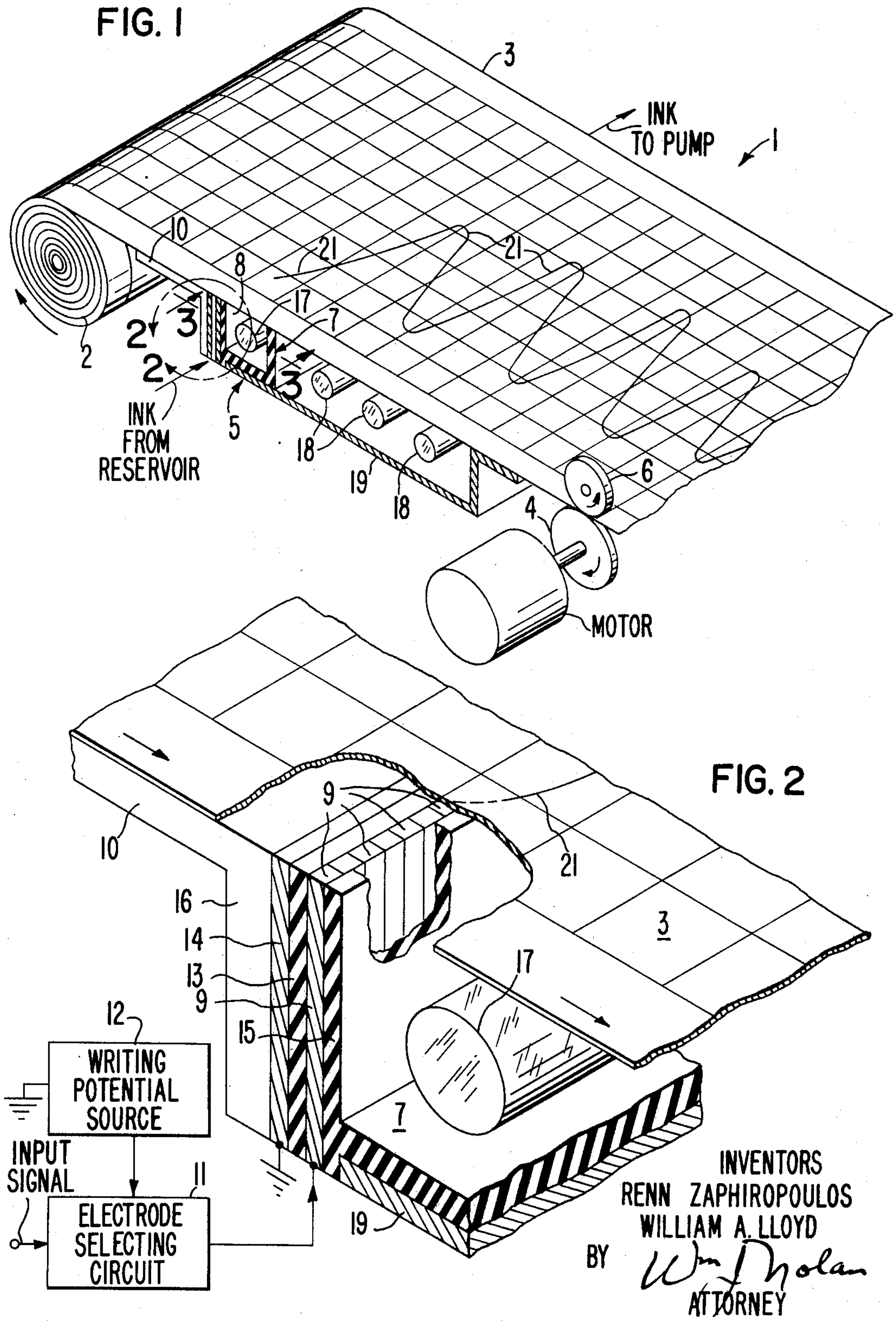

The present invention relates in general to graphic recorders or printers and, more particularly, to an improved electrostatic recorder or printer using a translucent recording medium with back illumination at the inking means whereby the recorded images on the recording medium are made visible to an observer as they are being developed. Such an improved graphic recorder is especially useful for, but not limited to, slow chart speed electrostatic recorders as the recorded signal is essentially immediately observable. Also it permits construction of a recorder with all the writing and inking functions performed on the remote side of the chart paper from the observer, whereby unobstructed access to the recording medium for viewing and making notations by the observer is obtained.

Heretofore, electrostatic graphic printers have been proposed wherein an electrostatic image is laid down by a writing electrode or array of electrodes upon a dielectric medium or web. The image is subsequently developed, i.e., made visible by applying charged pigment particles to the imaged web. The particles are bound to the charge image by electrostatic attraction and are fixed by drying or heating of the web. Typically, the chart paper or web advances from the position where the charge image is deposited through the inking chamber where the pigment is applied. The recorded image is, thus, not observable until the visible image emerges from the inking chamber. At slow chart speeds, the delay between the recording of the event and observation of the recorded event can be appreciable.

In the present invention, the electrostatic writing is done on a translucent medium as close as possible to the inking station, even inside the inking station, and the inking station is provided with back illumination, whereby the recorded electrostatic images are essentially immediately observable. Another advantage of the present invention, aside from the speed with which the recording may be observed, is the clear and unobstructed access thereby obtained to the observer's side of the recording. This clear access permits writing of notations on the recording web as the signal is being recorded.

The principal object of the present invention is the provision of an improved electrostatic graphic recorder or printer. One feature of the present invention is the provision of an electrostatic graphic recorder or printer employing a translucent recording medium and means for back illuminating the recording medium at the inking station, whereby the recorded image can be essentially immediately observed, and whereby the observer has access to make notations on the unobstructed and dry top surface of the recording as the visible image is formed.

Another feature of the present invention is the same as the preceding feature wherein the means for writing electrostatic images on the translucent recording medium forms a portion of or is disposed inside the inking station, whereby the delay between the recording and inking functions is reduced.

Figure 3:
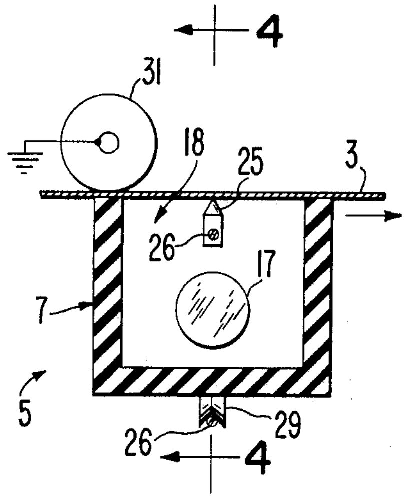
Figure 4:
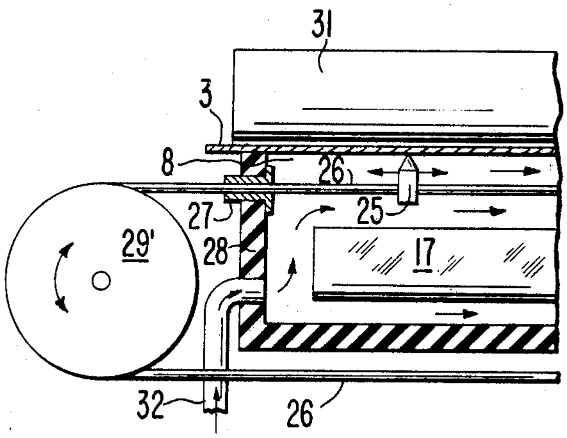
Figure 5:
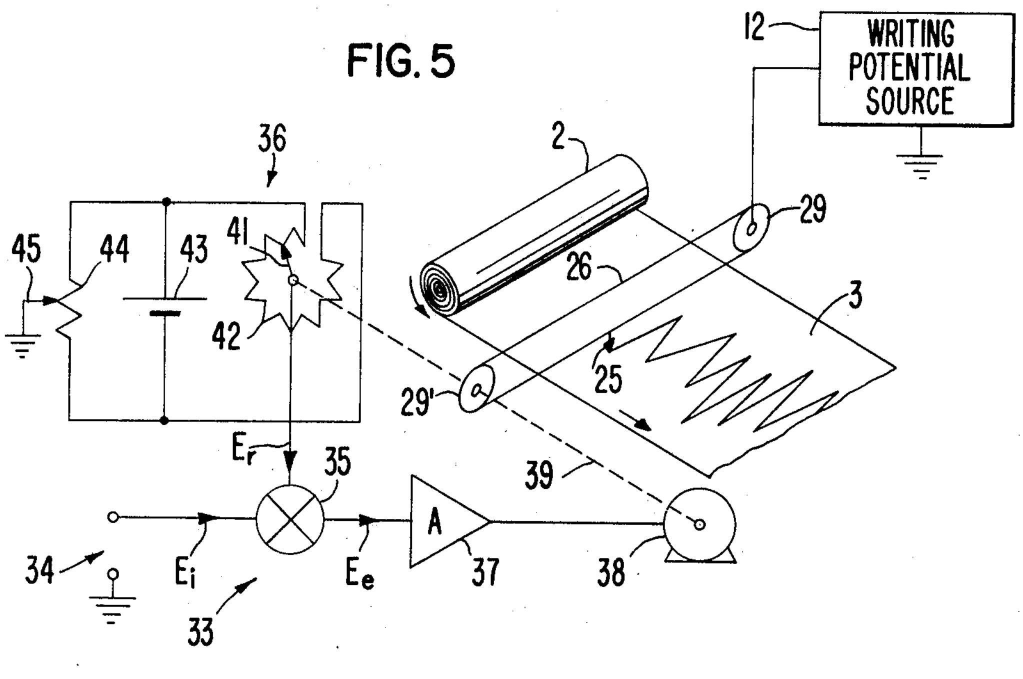

Other features and advantages of the present invention will become apparent upon a perusal of the following specification taken in connection with the accompanying drawings wherein:

FIG. 1 is a perspective schematic view, partly in section, of an electrostatic writing machine employing features of the present invention, FIG. 2 is an enlarged detail view of a portion of the structure of FIG. 1 delineated by line 2—2, FIG. 3 is an enlarged sectional view of an alternative embodiment of the structure of FIG. 1 taken along line 3—3 in the direction of the arrows, FIG. 4 is a sectional view of the structure of FIG. 3 taken along line 4—4 in the direction of the arrows, and FIG. 5 is a schematic circuit diagram of a graphic recorder apparatus employing features of the present invention.

Referring now to FIGS. 1 and 2, there is shown an electrostatic writing machine 1 incorporating features of the present invention. More particularly, the machine 1 includes a supply roll 2 of electrostatic recording medium or web 3. The web 3 is pulled by a variable speed, motor driven friction wheel 4 from the supply roll 2 over a combined writing and inking station 5. The friction wheel 4 grips the web 3 between itself and an idler wheel 6. The web 3 is pulled at any convient speed ranging from a few inches per hour to 100 inches per second depending upon the time separation between events to be recorded.

The combined writing and inking station 5 includes a hollow inking channel member 7 as of a transparent plastic such as Lucite. The inking channel 7 extends laterally across the web 3. An input port, not shown, provided in one end of the inking channel, is connected via tubulation to an ink reservoir or source, not shown. An output port, not shown, is provided in the other end of the inking channel 7 and is connected via tubulation to the suction end of a pump for pumping the ink through the inking channel 7 at less than atmospheric pressure.

The inking channel 7 is provided with an inking slot 8 along the side of the channel 7 which is disposed adjacent the recording web 3. The reduced pressure in the inking channel 7 causes the recording web 3 to be pushed against the marginal edges of the inking slot 8 by atmospheric pressure, thereby sealing the slot 8 and preventing leakage of the fluid ink (electrographic toner).

An array of writing electrodes 9, as of copper, are disposed in the leading marginal edge of the inking slot 8. The electrodes 9 are elongated in a direction extending away from the recording web 3 and are connected to an electrode selecting circuit 11 which selects the particular one of the electrodes 9 to which to apply a writing potential, as of −300 to −1000 volts, derived from a writing potential source 12. The electrodes 9 are insulated from each other such that they can be selectively energized with the writing potential. In a preferred embodiment, the electrode array 9 is formed on one side of an insulative printed circuit board 13. A sheet electrode 14, as of copper, is formed on the opposite side of the circuit board 13. A sheet of insulation 15 is disposed over the array 9 on the side facing the interior of the inking channel 7. The sheet electrode 14 is preferably operated at ground potential and the circuit board 13 with its electrodes 9 and 14 is preferably affixed to the inside surface of an outer wall 16 of the channel 7.

An elongated light bulb 17 is disposed inside the inking channel 7 and extends laterally of the web 3 with the inking channel 7. Additional light bulbs 18 are disposed laterally of the web 3. The light bulbs 18 are disposed in spaced relation spaced apart in the direction of movement of the web 3. A light reflective housing 19 is disposed around the bulbs 18 for reflecting their light up against the web 3.

The recording web 3 is translucent and, in a preferred embodiment, is laminated consisting of a translucent, conductive paper backing laminate portion with a dielectric film laminate surface portion. The dielectric film forms the electrostatic charge retentive recording surface and is disposed adjacent the writing electrode structure 9 and the inking slot 8. A suitable translucent electrostatic recording paper or web 3 is marketed by Crown Zellerbach, Inc.

In operation, electrical signals to be recorded are fed into the electrode selecting circuit 11 which applies the writing potential to the proper one of the electrodes 9 in a lateral position on the web 3 corresponding to the amplitude of the signal to be recorded. The localized writing potential applied to the web 3 between the selected writing electrode 9 and the grounded sheet electrode 14 causes a line charge image to be deposited on the dielectric recording surface of the web 3.

The charge image then moves immediately with the web 3 into contact with colloidally suspended and charged pigment particles in the inking slot 8. Pigment particles of the ink are drawn out of suspension and electrostatically bound essentially only to the charge image portion of the web 3. In this manner, the developed signal image is rendered visible at 21 through the translucent web 3 due to the back illumination afforded by the light bulb 17 within the inking slot portion 8 of the inking channel 7.

Disposing the writing and inking station close together and on the remote side of the translucent recording paper from the observer, allows the observer unobstructed access to the visible signal trace 21, essentially as soon as it is written. Thus, the observer is free to make notations directly on the recording as it is being made. Accordingly, to facilitate such note making, a lip portion 10 of the inking channel extends underneath the recording web 3 from the channel 7 toward the suppy roll 2 to form a writing surface for such notations. Likewise, the trailing edge of the slot 8 may be made of translucent material, such as Lucite, and disposed underneath the recording web 3 to provide additional writing surface.

The trailing edge of the inking slot 8 serves to provide a sort of squeegee action on the developed web 3 for removing excess ink. The heat from the additional light bulbs 18 assist in fixing the developed image and keep the image illuminated for continued observation.

The ink comprises fluid colloidal suspension of finely divided pigment particles. The fluid of the colloidal suspension is a dielectric and may be a gas such as air or a liquid such as Shell Chemical Company's number 72 solvent. A suitable liquid ink is a 2% to 4% mixture by volume of electrographic toner concentrate in number 72 solvent. In case a liquid ink is utilized, the developed image is fixed merely upon drying of the moistened web 3 upon leaving the inking channel 7. In case an air suspension of toner is used, then the image is fixed by heating, such as that provided by the bulbs 18 or by special infrared bulbs, not shown. The heat serves to meet the dielectric film of the web 3 or to melt a wax coating on the pigment particles.

Although the present invention has been explained, in regard to FIGS. 1 and 2, as used in a graphic recorder apparatus, it is equally applicable to other types of electrostatic writers and printing devices. More particularly, the pin electrode array 9 of FIGS. 1 and 2 may just as well be an electrode array for printing alphanumeric characters for a noiseless electronic typewriter or printer.

Refering now to FIGS. 3–5, there is shown an alternative combined writing and inking station embodiment of the present invention. In this embodiment, the writing electrode is movable, as by a cable drive, and is disposed inside the inking channel 7 of the inking station 5. A writing electrode or stylus 25 is carried upon a conductive cable 26, such as a stranded stainless steel cable. The cable 26 passes through a pair of sleeves 27 in the opposite end walls 28 of the inking channel 7, only one end wall 27 is depicted. A pair of pulleys 29 are disposed externally of the inking channel 7 and the cable 26 forms a closed loop around both pulleys 29. One of the pulleys 29′ is a drive pulley and is made of an insulative material, the other is an idler pulley and is conductive and connected to the source of writing potential 12. Thus, the writing potential is applied to the stylus 25 which rides to and fro laterally of and against the recording surface of the web 3. The second writing electrode is a conductive roller 31 which is grounded and makes contact with the conductive side of the web 3 at the lip of the inking slot 8. Electrographic ink (toner) is fed into the inking channel 7 through a tubulation 32, as before described, in the end wall 28 of the inking channel 7.

The drive pulley 29′ is coupled to rotate with the output shaft of a null balance potentiometric recorder circuit 33, shown in FIG. 5. More specifically, a pair of input terminals 34 are provided across which the signal to be recorded is applied. The input signal $E_i$ is fed to one input of an error detector (comparator) circuit 35 for comparison with a reference signal $E_r$ obtained from a potentiometer circuit 36 to derive an error or unbalance signal $E_e$. The error signal $E_e$ is fed to an amplifier 37 wherein it is amplified and fed to the drive circuit of a reversible motor 38.

The output shaft 39 of the motor is coupled to the pickoff 41 of a potentiometer 42 of the potentiometer circuit 36. The picked off potential is fed as the reference signal $E_r$ to the error detector 35. The potentiometer circuit 36 includes a voltage source 43 parallel connected to both the reference potentiometer 42 and a second potentiometer 44. The pickoff 45 of the second potentiometer is connected to one input terminal of the recorder, which is preferably ground, for establishing the zero input voltage reference for the recorder.

In operation, a change in the input signal produces an error signal $E_e$ which causes the motor 38 to turn the pickoff 41 around the potentiometer 42 until the picked off potential just balances the new input signal. Thus, the output shaft's rotations track the input signal. The drive pulley 29′ is coupled to the output shaft 39 such that the coupled stylus 25 tracks or reproduces the input signal and deposits a reproduced charge image signal on the recording web 3. The charge image is immediately developed by the pigment particles in the ink. The developed signal is immediately visible to an observer due to the back illumination of the developed image by light source 17 and the translucent nature of the recording web 3. The second writing electrode 31 need not be directly above the stylus 25 due to the conductive nature of the back side of the recording web 3.

Although the writing electrode array 9 of FIGS. 1 and 2 has been depicted as disposed in the marginal edge of the inking slot 8, it could have been disposed centrally of the slot 8, as was the stylus electrode 25. Also the second electrode 14 of FIGS. 1 and 2 could have been replaced by the second electrode 31, disposed on the opposite side of the web 3.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electrostatic writing apparatus including, means forming a writing electrode structure for depositing electrostatic charge images onto a flexible translucent recording web in response to an applied writing potential, means forming an inking station for applying pigment particles to said charge images for developing same into visible images, means forming a supply of said flexible translucent recording web, means for moving said recording web from said supply past said writing electrode structure and said inking station to produce a strip type recording, means including a light source disposed at said inking station for illuminating the image side of said translucent web at said inking station, whereby the developed images become readable to an observer on the side of the recording web remote from the developed images essentially immediately upon development thereof, and wherein said inking station means includes an inking slot laterally directed of the recording web and through which the imaged side of the recording web is brought into contact with the inking particles, and wherein said light source is disposed inside the marginal edges of said inking slot.

2. An electrostatic writing apparatus including, means forming a writing electrode structure for depositing electrostatic charge images onto a flexible translucent recording web in response to an applied writing potential, means forming an inking station for applying pigment particles to said charge images for developing same into visible images, means forming a supply of said flexible translucent recording web, means for moving said recording web from said supply past said writing electrode structure and said inking station to produce a strip type recording, means including a light source disposed at said inking station for illuminating the image side of said translucent web at said inking station, whereby the developed images become readable to an observer on the side of the recording web remote from the developed images essentially immediately upon development thereof, and wherein said inking station comprises an inking channel having an inking slot directed transverse the recording web within which said pigment particles are carried in a liquid and said electrode structure and said light source are disposed inside the marginal edges of said inking slot.

References Cited

UNITED STATES PATENTS

| | | | |
|---|---|---|---|
| 2,307,131 | 1/1943 | Holt | 346—17 |
| 2,985,728 | 5/1961 | Macune | 346—34 |
| 3,076,968 | 2/1963 | Schwertz | 346—74 |
| 3,213,429 | 10/1965 | Schwertz | 346—74 |
| 3,214,764 | 10/1965 | Williams | 346—74 |
| 3,303,509 | 2/1967 | Smith | 346—34 |
| 3,308,473 | 3/1967 | Sawazaki | 346—74 |

BERNARD KONICK, Primary Examiner

LEE J. SCHROEDER, Assistant Examiner

346—32